United States Patent
Zhang et al.

(10) Patent No.: US 12,052,609 B2
(45) Date of Patent: Jul. 30, 2024

(54) METHOD FOR LOW LAYER INTER-CELL MOBILITY MANAGEMENT

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Jie Cui, San Jose, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,440

(22) PCT Filed: Feb. 12, 2020

(86) PCT No.: PCT/CN2020/074949
§ 371 (c)(1),
(2) Date: Sep. 23, 2021

(87) PCT Pub. No.: WO2021/159351
PCT Pub. Date: Aug. 19, 2021

(65) Prior Publication Data
US 2022/0377622 A1 Nov. 24, 2022

(51) Int. Cl.
*H04W 36/00* (2009.01)
*H04W 72/21* (2023.01)

(52) U.S. Cl.
CPC .... *H04W 36/0011* (2013.01); *H04W 36/0058* (2018.08); *H04W 72/21* (2023.01)

(58) Field of Classification Search
CPC ......... H04W 36/0011; H04W 36/0058; H04W 72/21; H04W 36/0055; H04W 36/0061;
(Continued)

(56) References Cited

U.S. PATENT DOCUMENTS

2013/0344869 A1* 12/2013 Yamada ............ H04W 36/0094
455/67.11
2017/0347270 A1* 11/2017 Iouchi .................. H04L 5/0098
(Continued)

FOREIGN PATENT DOCUMENTS

CN 110474724 A 11/2019
CN 110519853 A 11/2019
(Continued)

OTHER PUBLICATIONS

International Search Report and Written Opinion of the International Searching Authority directed to related International Patent Application No. PCT/CN2020/074949, dated Nov. 25, 2020; 6 pages.
(Continued)

*Primary Examiner* — Ashley Shivers
(74) *Attorney, Agent, or Firm* — Sterne, Kessler, Goldstein & Fox P.L.L.C.

(57) ABSTRACT

Some embodiments include an apparatus, method, and computer program product for using low layer protocols for inter-cell mobility management in a 5G wireless communications system. A serving 5G node B (gNB) can configure reports that a user equipment (UE) transmits to the serving gNB to make handover decisions. The serving gNB can configure a group of Transmission Configuration Indication (TCI) states (e.g., a group of beams) that correspond a physical cell, and the report includes layer 3 measurements corresponding to a neighboring or serving cell's TCI state. The report can be conveyed using lower layer protocols. The report can include layer 1 measurements conveyed using a layer 1 protocol and the serving gNB can perform filtering to generate corresponding layer 3 measurement results. Based on the reports, the serving gNB can perform a
(Continued)

handover and synchronization using lower layer protocols, from one TCI state to another.

20 Claims, 11 Drawing Sheets

(58) Field of Classification Search
CPC .. H04W 36/0085; H04W 36/30; H04W 72/23
See application file for complete search history.

(56) References Cited

U.S. PATENT DOCUMENTS

| | | |
|---|---|---|
| 2018/0083680 A1 | 3/2018 | Guo et al. |
| 2019/0222289 A1* | 7/2019 | John Wilson ....... H04W 72/046 |
| 2021/0378045 A1* | 12/2021 | Zhang ................... H04W 76/25 |
| 2022/0386195 A1* | 12/2022 | Ishii ...................... H04W 76/15 |

FOREIGN PATENT DOCUMENTS

| | | |
|---|---|---|
| WO | WO 2019/140256 A1 | 7/2019 |
| WO | WO 2019/190180 A1 | 10/2019 |

OTHER PUBLICATIONS

NTT Docomo, Inc., "Discussion on CORSET0," 3GPP TSG RAN WG1 Meeting #95 R1-1813934, Nov. 16, 2018; Retrieved Sep. 14, 2021; 80 pages.

Extended European Search Report directed to related European Application No. 20918861.4, mailed Jun. 22, 2023; 12 pages.

Ericsson, "Lower-layer mobility enhancements," 3GPP TSG-RAN WG1 Meeting #99, R1-1912060, Nov. 8, 2019; 10 pages.

"3rd Generation Partnership Project; Technical Specification Group Radio Access Network; NR; Radio Resource Control (RRC) protocol specification (Release 15)", Jan. 27, 2020, XP051845870; 572 pages.

* cited by examiner

```
CSI-ResourceConfig ::=    SEQUENCE {
  csi-ResourceConfigId    CSI-ResourceConfigId,
  csi-RS-ResourceSetList  CHOICE {
    nzp-CSI-RS-SSB          SEQUENCE {
      nzp-CSI-RS-ResourceSetList  SEQUENCE (SIZE (1..maxNrofNZP-CSI-RS-ResourceSetsPerConfig)) OF NZP-CSI-RS-ResourceSetId OPTIONAL, -- Need R
      csi-SSB-ResourceSetList     SEQUENCE (SIZE (1..maxNrofCSI-SSB-ResourceSetsPerConfig)) OF CSI-SSB-ResourceSetId
        OPTIONAL -- Need R
    },
    csi-IM-ResourceSetList  SEQUENCE (SIZE (1..maxNrofCSI-IM-ResourceSetsPerConfig)) OF CSI-IM-ResourceSetId
  },
  physCellId    PhysCellId, OPTIONAL
  bwp-Id        BWP-Id,
  resourceType  ENUMERATED { aperiodic, semiPersistent, periodic },
  ...
}
```

FIG. 3

Event triggered report gNB triggered report

METHOD FOR LOW LAYER INTER-CELL MOBILITY MANAGEMENT

CROSS-REFERENCE TO RELATED APPLICATION

This application is a U.S. National Phase of International Application No. PCT/CN2020/074949, filed Feb. 12, 2020, which is hereby incorporated by reference in its entirety.

BACKGROUND

Field

The described embodiments relate generally to 5G wireless communication, including handovers.

Related Art 5G wireless communications systems include handovers from a serving 5G Node B (gNB) cell to a neighboring cell that are handled by Radio Resource Control (RRC) signaling at layer 3.

SUMMARY

Using Radio Resource Control (RRC) signaling at layer 3 for 5G wireless handovers incurs significant delays, especially on the interface between a user equipment (UE) and a serving 5G Node B (gNB). Some embodiments include a serving gNB collecting neighboring cell information via a user equipment (UE) and then making handover decisions based on the collected information. The collected information can include layer 3 (L3) signal measurements, layer 1 (L1) signal measurements that are then L3-filtered by the serving gNB, and beam information that enables the serving gNB to group beams according to 5G wireless cells. Some embodiments include the serving gNB using low layer signaling (e.g., L1 and/or L2 signaling) to handover 5G wireless communications from a beam of the serving gNB to a different beam of a neighboring cell.

Some embodiments include an apparatus, method, and computer program product for low layer inter-cell mobility management that reduces the handover delay on the UE to serving gNB interface. Some embodiments include a serving gNB that determines Synchronization Signal Block (SSB) or Channel-State Information-Reference Signal (CSI-RS) measurements to be performed on a neighboring cell as a Channel Measurement Resource (CMR) in a reportConfig and collects data comprising a physical cell ID of the neighboring cell based at least on the reportConfig. The serving gNB, can configure N groups of Transmission Configuration Indication (TCI) states for the UE, where a TCI state corresponds to a beam. The first group of the N groups corresponds to the serving gNB cell and a second group of the N groups corresponds to the physical cell ID of the neighboring cell. The serving gNB can decide to perform a handover based at least on the data collected, and perform the handover from a TCI state of the first group to a TCI state of the second group.

To collect L3 data, the serving gNB can trigger a L3 results report, and receive the L3 results report from the UE via an Uplink Control Information (UCI) signal, where the L3 results report includes: a L3-Reference Signal Received Power (RSRP), a L3-Reference Signal Received Quality (RSRQ), or a L3-Signal to Noise & Interference Ratio (SINR). The UCI signal can include a Physical Uplink Control Channel (PUCCH) signal or a Physical Uplink Shared Channel (PUSCH) signal. The serving gNB can use RRC signaling, Media Access Control (MAC) Control Element (CE) signaling, or Downlink Control Information (DCI) signaling to trigger the L3 results report.

In some embodiments the serving gNB can determine an event that triggers a L3 event-based report, and reserve a resource in a PUCCH signal or a PUSCH signal that enables the UE to provide the event-based report. The serving gNB can transmit the event that triggers the event-based report and the reserved resource to the UE. The serving gNB can receive the event-based report from the UE via a UCI signal, where the event-based report includes L3 measurements such as: a L3-RSRP, a L3-RSRQ, or a L3-SINR.

In some embodiments, the serving gNB can trigger a L1 results report, and receive the L1 results report from the UE via a UCI signal, where the L1 results report can include L1 measurements such as: a L1-RSRP, a L1-RSRQ, or a L1-SINR. The serving gNB can receive an indication of whether the L1 results report is from a same or a different TCI state as a previous L1 results report. When the serving gNB determines based on the indication that the L1 results report is from the same TCI state (e.g., the same beam) as the previous L1 results report, the serving gNB can continue performing L3 filtering based on the previous L1 results report and the L1 results report. When the serving gNB receives an indication that the L1 results report is from a different TCI state than the previous L1 results report, the serving gNB can restart L3 filtering based on the L1 results report alone. The serving gNB can use the results of the L3 filtering to configure the N groups of TCI states and decide whether to perform a handover.

The serving gNB can perform a handover by switching 5G wireless communications from a TCI state of one cell to a TCI state of another cell using L1 or L2 signaling. For example, to perform the handover, the serving gNB can use a MAC CE to switch from a TCI state of the first group of TCI states corresponding to the serving gNB cell to a TCI state of the second group of TCI states corresponding to the neighboring cell. In some embodiments, the serving gNB can perform the handover using a Downlink Control Information (DCI) signal to switch from a TCI state of the first group to a TCI state of the second group, where the DCI signal includes a downlink assignment, an uplink grant, or a dedicated DCI format.

In some embodiments the UE can receive instructions from the serving gNB to report measurements, and the UE can transmit a report based on the instructions to the serving gNB. Subsequently, the UE can receive from the serving gNB via a MAC CE or a DCI that includes a new TCI state of a neighboring cell, switch from a TCI of the serving gNB to the new TCI state, and communicate with the neighboring cell via the new TCI state. In response to switching to the new TCI state, the UE can start a confirmation timer. To communicate with the neighboring cell via the new TCI state, the UE can receive a dedicated Physical Downlink Control Channel (PDCCH) from the neighboring cell via the new TCI state, and stop the confirmation timer. The UE can apply a new Timing Advance Group (TAG) corresponding to the neighboring cell before transmitting an uplink signal.

When the instructions received from the serving gNB include a request for a L3 results report, the UE can transmit the L3 results report via a PUCCH signal or a PUSCH signal. In some embodiments, the instructions include an event that triggers an event-based report and a reserved resource, and the UE can determine that the event is triggered. The UE can transmit the event-based report according to the reserved resource via a PUCCH signal or a PUSCH signal. If the PUCCH signal or the PUSCH signal collides with a second signal, the UE can drop and subsequently resend the PUCCH signal or the PUSCH signal. The second signal may be: a Physical Random Access Channel (PRACH) signal, a Scheduling Request (SR) signal, or a Hybrid Automatic Repeat Request (HARQ)-ACK signal. If the instructions from the serving gNB does not include reserved resources, the UE can determine that the event is triggered, and request a resource by dedicated or normal scheduled request (SR) to transmit the event-based report to the serving gNB.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 3 illustrates an example configuration report request for low layer inter-cell mobility management, according to some embodiments of the disclosure.

Figure 1:
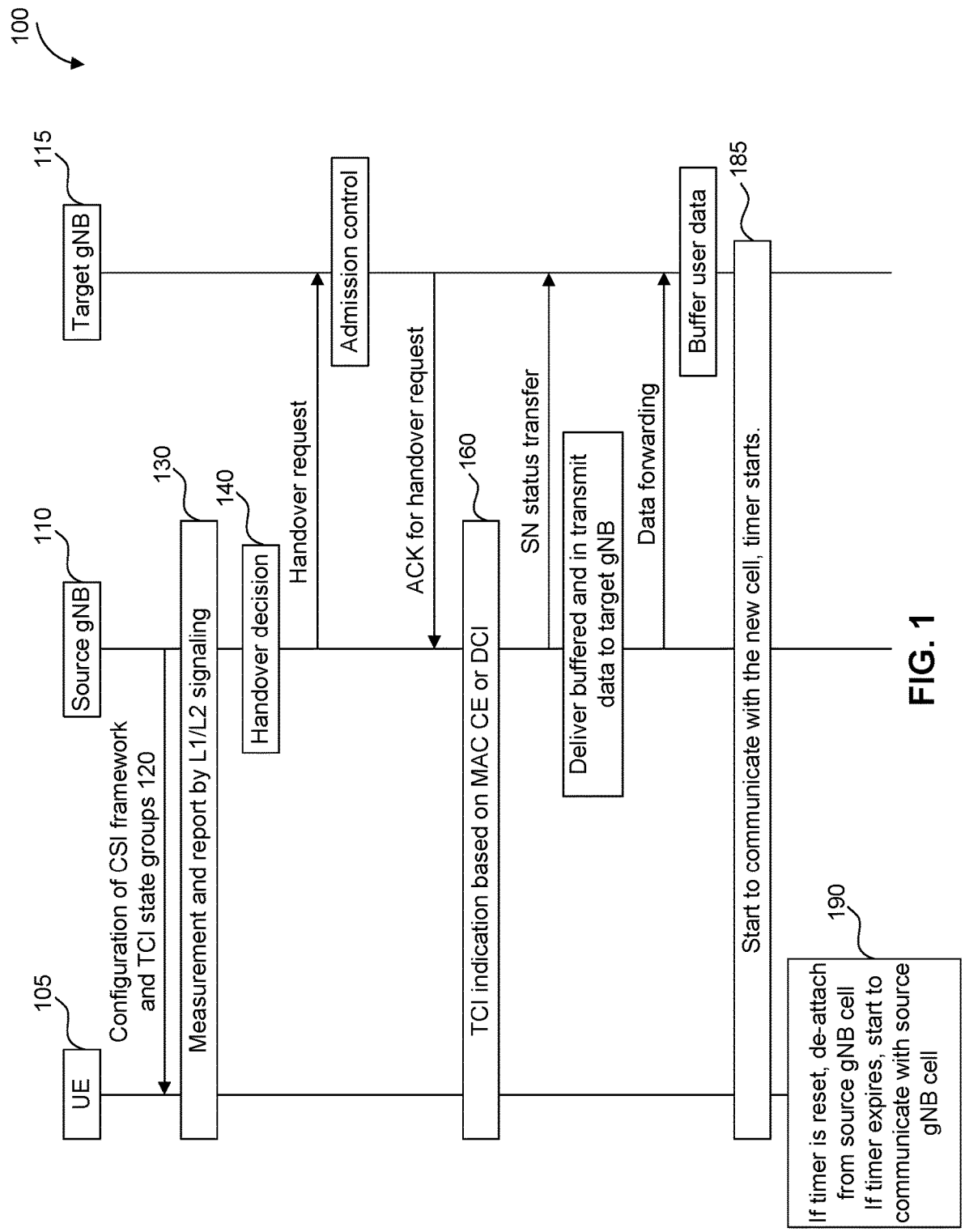
FIG. 1 illustrates an example system for low layer inter-cell mobility management, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Figure 11:
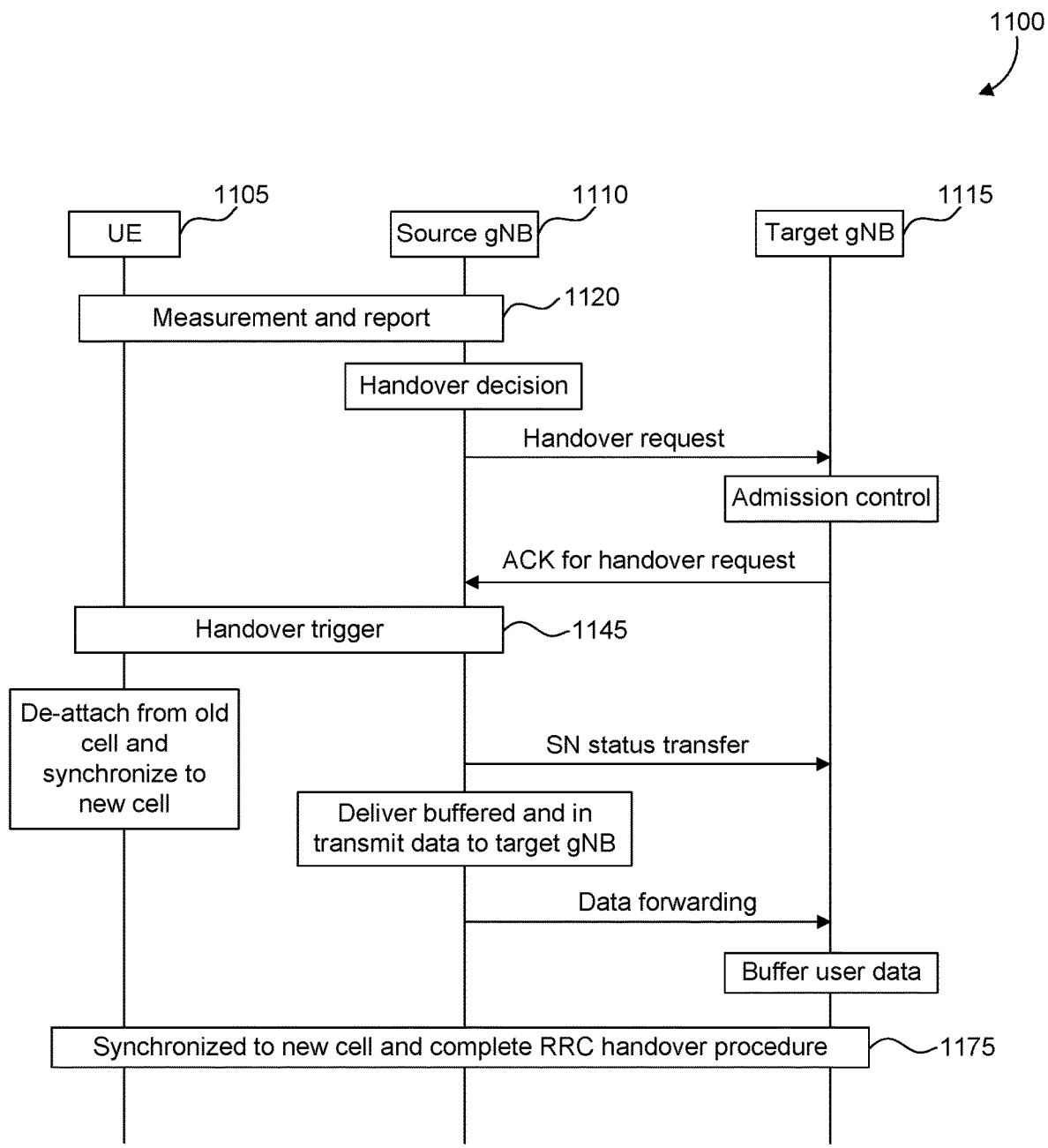
FIG. 11 is an example system for inter-cell mobility management, in accordance with some embodiments of the disclosure.

A 5G wireless communications system can perform handovers from a serving 5G Node B (gNB) cell to a neighboring cell where the handovers are managed by Radio Resource Control (RRC) signaling at layer 3. FIG. 11 illustrates an example system 1100 for inter-cell mobility management, in accordance with some embodiments of the disclosure. System 1100 includes user equipment (UE) 1105, Source gNB 1110, and Target gNB 1115, where UE 1105 first communicates with Source gNB 1110. After a handover takes place, UE 1105 communicates with Target gNB 1115. In system 1100, measurement and report 1120, handover trigger 1145, and synchronization to new cell and complete RRC handover procedure 1175 are handled by RRC signaling at layer 3, and together the three stages incur a large time delay. Layer 3 (L3) refers to the network layer in the Open System Interconnect (OSI) model.

Some embodiments herein include an apparatus, method, and computer program product for using low layer protocols for inter-cell mobility management in a 5G wireless communications system. A serving gNB can configure and request reports that a UE uses as a basis to collect neighboring cell information including L3 signal measurements and layer 1 (e.g., physical layer of OSI, (L1)) signal measurements from various beams of a neighboring cell. The UE collects and transmits the information in reports to the serving gNB that makes handover decisions. The serving gNB can use the reports to organize the respective measurements according to beams within different 5G wireless cells. For example, the serving gNB can configure a group of Transmission Configuration Indication (TCI) states (e.g., a group of beams) to correspond a physical cell ID. The report can be conveyed to the serving gNB using lower layer protocols. When the report includes L1 measurements, the serving gNB can perform filtering to generate corresponding layer 3 measurement results. Based on the reports, the serving gNB can perform a handover and synchronization using lower layer protocols, from one TCI state to another. In this disclosure, a serving gNB provides 5G wireless communications for a serving cell and a neighboring gNB provides 5G wireless communications for a neighboring cell. A serving gNB can also be called a Source gNB and a neighboring gNB can be called a Target gNB.

FIG. 1 illustrates an example system 100 for low layer inter-cell mobility management, in accordance with some embodiments of the disclosure. System 100 includes UE 105 that first communicates with Source gNB 110, and then after a handover, UE 105 communicates with Target gNB 115. In some embodiments, Source gNB 110 transmits a signal for configuration of a Channel State Information (CSI) framework and TCI state groups 120 to UE 105. Accordingly, UE 105 performs measurements and reports them to Source gNB 110 based on the CSI framework.

The exchange is shown as measurement and report by L1/layer 2 (L2) signaling 130. Source gNB 110 receives the measurements in reports. Based on the reports, Source gNB 110 can group TCI states (e.g., group beams) from a neighboring cell (e.g., a Target gNB cell) into a group. And, Source gNB 110 can group TCI states from the Source gNB cell (e.g., a serving gNB cell) into another group. Using the measurements and the groupings of TCI states, Source gNB 110 makes a handover decision 140 to change from one beam (e.g., TCI state) to another using L1 or L2 signaling. For example, the handover decision 140 can instruct a handover from a first TCI state in a first group associated with the source gNB 110 to a second TCI state in a second group associated with the target gNB 115.

Source gNB 110 can provide a TCI indication to UE 105 based on Media Access Control (MAC) Control Element (CE) or Downlink Control Information (DCI) signaling shown at 160. MAC CE signaling occurs at L2 and DCI signaling occurs at L1. Subsequently, UE 105 uses the TCI indication received to switch from a TCI state of Source gNB 110 to a TCI state of Target gNB 115. After a given number of slots pass (e.g., after a given number of milliseconds pass) as appropriate, after an ACK for example, UE 105 sets a confirmation timer and begins to communicate with the new cell and Target gNB 115 shown at 185.

The confirmation timer is a mechanism that allows UE 105 to revert to communicating with Source gNB 110 in the event the handover with Target gNB 115 fails. For example, at 190 if UE 105 receives a signal from Target gNB 115 (e.g., a Physical Downlink Control Channel (PDCCH) signal, then the confirmation timer is reset, essentially stopped. UE 105 de-attaches from the Source gNB cell and continues communicating with Target gNB 115. Otherwise, the confirmation timer can expire and UE 105 starts to communicate with Source gNB cell. Thus, in contrast to 5G wireless systems that rely on RRC layer signaling (e.g., FIG. 11), FIG. 1 utilizes low layer signaling (e.g., L1 and/or L2) to perform inter-cell mobility management. Thus, the corresponding functions have a lower delay time compared to system 1100 of FIG. 11.

Figure 2:
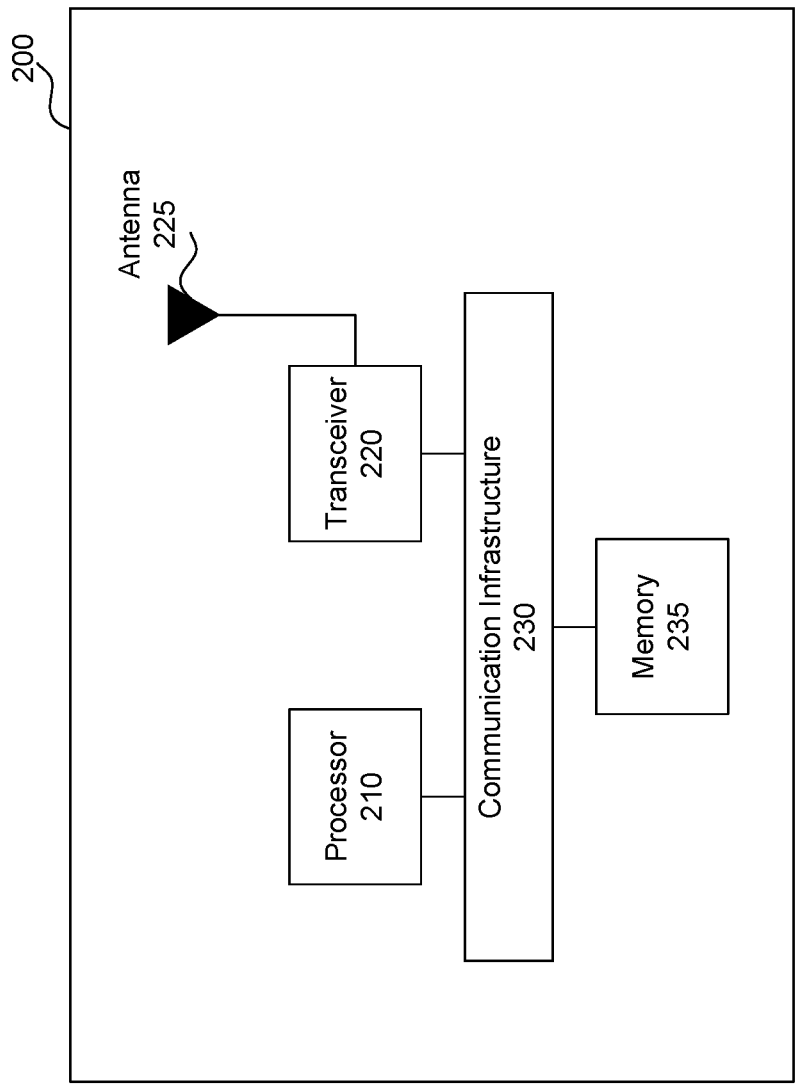
FIG. 2 illustrates a block diagram of an example wireless system for low layer inter-cell mobility management, according to some embodiments of the disclosure.

FIG. 2 illustrates a block diagram of an example wireless system 200 for low layer inter-cell mobility management, according to some embodiments of the disclosure. As a convenience and not a limitation, system 200, may be described with elements of FIG. 1. System 200 can be UE 105, Source gNB 110, or Target gNB 115 of FIG. 1. For example a gNB can be a 5G base station. A UE may be a computing electronic device such as a smart phone, cellular phone, and for simplicity purposes—may include other computing devices including but not limited to laptops, desktops, tablets, personal assistants, routers, monitors, televisions, printers, and appliances. System 200 may include processor 210, transceiver 220, communication infrastructure 230, memory 235, and antenna 225 that together perform operations enabling low layer inter-cell mobility management. Transceiver 220 transmits and receives 5G wireless communications signals via antenna 225. Communication infrastructure 230 may be a bus. Memory 235 may include random access memory (RAM) and/or cache, and may include control logic (e.g., computer software), computer instructions, and/or data. Processer 210, upon execution of the computer instructions, can be configured to perform the functionality described herein for low layer inter-cell mobility management. Alternatively, processor 210 can include its own internal memory (not shown), and/or be "hard-wired" (as in a state-machine) configured to perform the functionality described herein for low layer inter-cell mobility management. Antenna 225 coupled to transceiver 220, may include one or more antennas that may be the same or different types to enable wireless communication over a wireless network.

FIG. 3 illustrates an example configuration report request 300 for low layer inter-cell mobility management, according to some embodiments of the disclosure. As a convenience and not a limitation, FIG. 3, may be described with elements of FIGS. 1 and/or 2. For example, in FIG. 1 configuration of CSI framework and TCI state groups signal 120 can include configuration report request 300 which can be a reportConfig that includes a physical cell ID (e.g., PhysCellId.) Source gNB 110 can configure a Synchronization Signal Block (SSB) and/or a Channel State Information (CSI)-Reference Signal (RS) from Target gNB 115 as a Channel Measurement Resource (CMR) in a reportConfig as shown in configuration report request 300. A physical cell ID can be configured for each CMR (e.g., for each gNB.) Thus, Source gNB 110 can use configuration report request 300 to request that UE 105 measure CMRs in different cells (e.g., measurements from different beams in neighboring cells) and transmit the measurements back to Source gNB 110 in a results report. With the measurements from various beams and neighboring cells, Source gNB 110 can make a determination of whether to handover to a neighboring cell and the corresponding TCI state (e.g., the corresponding beam.)

Figures 4A, 4B:
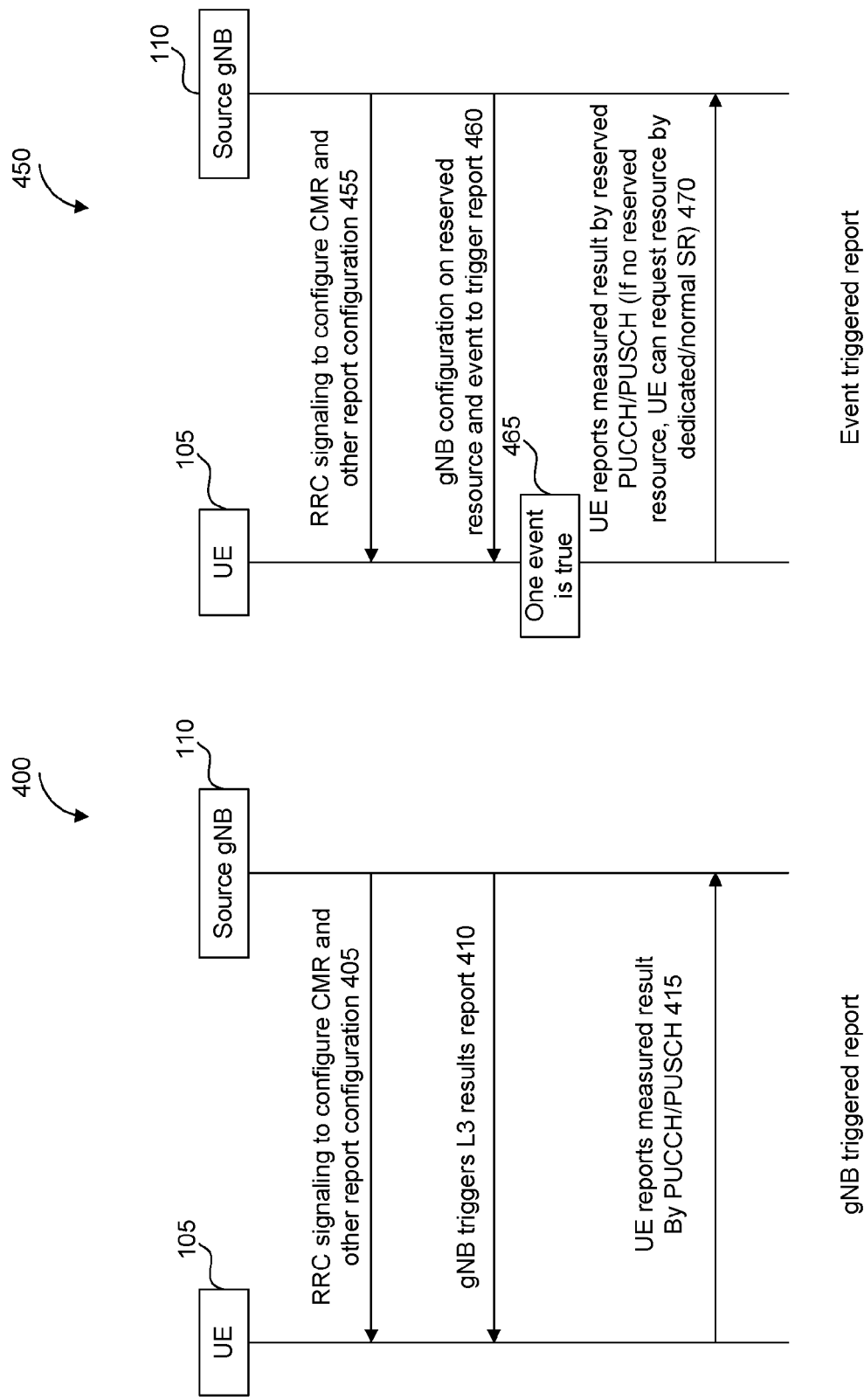
FIG. 4A illustrates a 5G Node B (gNB) triggering and receiving a layer 3 (L3) results report, according to some embodiments of the disclosure.
FIG. 4B illustrates event triggering and a gNB receiving a L3 results report, according to some embodiments of the disclosure.

FIG. 4A illustrates an example 400 of a gNB triggering and receiving a L3 results report, according to some embodiments of the disclosure. FIG. 4B illustrates an example 450 of an event triggering and a gNB receiving a L3 results report, according to some embodiments of the disclosure. As a convenience and not a limitation, examples 400 and 450, may be described with elements of FIGS. 1, 2, and/or 3. Examples 400 and 450 illustrate utilizing L1 and L2 signaling to provide measurements and reports (as described in FIG. 1) instead of using RRC signaling at L3 as described in FIG. 11. In particular, utilizing L1 and L2 signaling to provide measurements and reports requires less overhead and results in less latency (e.g., lower delay). As indicated above, L1 is the physical layer of the OSI model, whereas L2 is the data link layer of the OSI model. Example 400 is described first from Source gNB 110's point of view followed by UE 105's point of view. A similar description for example 450 follows.

Example 400 from Source gNB 110's Point of View:

At 405, Source gNB 110 transmits RRC signaling to configure CMR and other report configurations. The RRC signaling can include configuration report request 300 (e.g., a reportConfig) of FIG. 3, for low layer inter-cell mobility management. The configuration can request L3 measurements in a report, including but not limited to: L3-Reference Signal Received Power (RSRP), a L3-Reference Signal Received Quality (RSRQ), or a L3-Signal to Noise & Interference Ratio (SINR). The report can be configured to be periodic, semi-persistent, or aperiodic, and the report can be configured to be transmitted to Source gNB 110 by an Uplink Control Information (UCI) signal.

At 410, source gNB 110 transmits a signal that triggers UE 105 to respond with a L3 results report based on the report configurations arranged at 405 (e.g., configuration report request 300.) For example, the report can be triggered by an RRC signal, a MAC CE, or a DCI signal.

At 415, Source gNB 110 receives the L3 results report via UCI signaling at L1 (e.g., via a Physical Uplink Control Channel (PUCCH) signal or a Physical Uplink Shared Channel (PUSCH) signal.) The L3 results report can include for example, measurements from neighboring cells and corresponding TCI states collected by UE 105 based on configuration report request 300 and other configurations at 405.

Example 400 from UE 105's Point of View:

At 405, UE 105 receives RRC signaling to configure CMR and other report configurations that can include for example, configuration report request 300 of FIG. 3, for low layer inter-cell mobility management. The configuration can request L3 measurements in a report, including but not limited to: L3-RSRP, a L3-RSRQ, or a L3-SINR. The report can be configured to be periodic, semi-persistent, or aperiodic, and the report can be configured to be transmitted to Source gNB 110 by an Uplink Control Information (UCI) signal.

At 410, UE 105 receives a gNB signal that triggers a L3 results report. For example, the report can be triggered by an RRC signal, a MAC CE, or a DCI signal. In response, UE 105 can collect measurements from neighboring cells and corresponding TCI states based on configuration report request 300.

At 415, UE 105 transmits the measurements collected via UCI signaling (e.g., via a PUCCH signal or a PUSCH signal.) Collisions between the PUCCH or PUSCH signal carrying the measurements collected (e.g., report) and other signals are possible. Some examples of how a UE responds are shown below, but embodiments are not limited to these examples.

In some embodiments, when the PUCCH or PUSCH signal carrying the measurements collected (e.g., report) collides with a second signal, UE 105 drops the PUCCH or PUSCH signal carrying the measurements collected and resends them later. In some examples, UE 105 can instead drop the second signal and subsequently resend the second signal. Examples of the second signal include a Physical Random Access Channel (PRACH), a Scheduled Request (SR), or a Hybrid Automatic Repeat Request (HARQ)-ACK signal.

In some examples, when the PUCCH or PUSCH signal carrying the measurements collected (e.g., report) collides with a UCI other than SR/HARQ-ACK, UE 105 drops the UCI signal, and resends the UCI signal later. In some examples, when the PUCCH signal carrying the measurements collected (e.g., report) collides with a PUSCH signal, UE 105 drops the PUCCH signal, multiplexes the contents of the PUCCH signal carrying the measurements collected with the contents of the PUSCH signal, then transmits the multiplexed information via the PUSCH signal. In some examples, when the PUCCH or PUSCH signal carrying the measurements collected (e.g., report) collides with a Sounding Reference Signal (SRS), UE 105 drops the SRS signal, and resends the SRS signal later.

Example 450 from Source gNB 110's Point of View:

In example 400 described above, Source gNB 110 triggers an L3 results report. In example 450 described below, Source gNB 110 defines one or more events for a UE. The one or more events when true, trigger corresponding event-based reports.

At 455, Source gNB 110 transmits RRC signaling to configure CMR and other report configurations that can include for example, configuration report request 300 of FIG. 3, for low layer inter-cell mobility management. The configuration can request L3 measurements in a report, including but not limited to: L3-RSRP, a L3-RSRQ, or a L3-SINR. The report can be configured to be periodic, semi-persistent, or aperiodic, and the report can be configured, for example, to be transmitted to Source gNB 110 by an Uplink Control Information (UCI) signal.

At 460, Source gNB 110 transmits a signal that includes one or more events that triggers an event-based report, and one or more reserved resources for UE 105 to use to report the measurements.

Some examples of events include but are not limited to the following:

Event 1—one or more values of an RSRP, RSRQ, or SINR from a Source gNB beam, a Primary cell (PCell) beam, or a Primary Secondary Cell (PSCell) beam satisfies (e.g., becomes worse than) one or more settable threshold values.

Event 2—one or more values of an RSRP, RSRQ, or SINR from a neighbor gNB beam (e.g., Target gNB 115 beam) satisfies one or more settable offset threshold values (e.g., becomes an amount of offset better than corresponding values at a Source gNB beam, a Primary cell (PCell) beam, or a Primary Secondary Cell (PSCell) beam.)

Event 3—one or more values of an RSRP, RSRQ, or SINR from a neighbor gNB beam (e.g., Target gNB 115 beam) satisfies (e.g., becomes better than) one or more settable threshold values.

Event 4—one or more values of an RSRP, RSRQ, or SINR from a Source gNB beam, a Primary cell (PCell) beam, or a Primary Secondary Cell (PSCell) beam satisfies (e.g., becomes worse than) a first settable threshold value, and one or more values of an RSRP, RSRQ, or SINR from a neighbor gNB beam (e.g., Target gNB 115 beam) satisfies (e.g., becomes better than) a second settable threshold value.

Event 5—one or more values of an RSRP, RSRQ, or SINR from a neighbor gNB beam (e.g., Target gNB 115 beam) satisfies (e.g., becomes an offset amount better than) that of a Secondary Cell (SCell) beam.

At 470, Source gNB 110 receives one or more corresponding event-based reports in the reserved resources specified by Source gNB 110 at 460, in a PUCCH or PUSCH signal (e.g., L1 signaling.) The one or more corresponding event-based reports includes data collected in accordance with configurations at 455. The one or more corresponding event-based reports is triggered by one or more events named by Source gNB 110 at 460.

In the event Source gNB 110 did not reserve resources at 460, then Source gNB 110 can receive the one or more corresponding event-based reports via a resource, in response to UE 105 requesting a resource by dedicated or normal scheduled request (SR) (e.g., L2 signaling) to transmit the one or more corresponding event-based reports to Source gNB 110. Otherwise, Source gNB 110 receives the one or more corresponding event-based reports in response to UE 105 triggering a contention based PRACH (e.g., L3 signaling) to transmit the one or more corresponding event-based reports to Source gNB 110.

Example 450 from UE 105's Point of View:

At 455, UE 105 receives RRC signaling to configure CMR and other report configurations that can include for example, configuration report request 300 of FIG. 3, for low layer inter-cell mobility management. The configuration can request L3 measurements in a report, including but not limited to: L3-RSRP, a L3-RSRQ, or a L3-SINR. The report can be configured to be periodic, semi-persistent, or aperiodic, and the report can be configured, for example, to be transmitted to Source gNB 110 by an Uplink Control Information (UCI) signal.

At 460, UE 105 receives a signal that includes one or more events that triggers an event-based report and one or more reserved resources that Source gNB 110 provides. UE 105 collects measurements according to 455. Examples of the events are described above.

At 465, UE 105 determines that one or more of the collected measurements meet criteria of one or more events that triggers one or more corresponding event-based reports. UE 105 collects the information accordingly for each event-based report.

At 470, UE 105 transmits the one or more corresponding event-based reports using the reserved resources specified by Source gNB 110 in a PUCCH or PUSCH signal (e.g., L1 signaling.) In the event Source gNB 110 did not reserve resources (e.g., at 460), then UE 105 can request a resource by dedicated or normal scheduled request (SR) (e.g., L2 signaling) to transmit the one or more corresponding event-based reports to Source gNB 110. Otherwise, UE 105 can trigger a contention based PRACH (e.g., L3 signaling) to transmit the one or more corresponding event-based reports to Source gNB 110.

If UE 105 transmits the PUCCH or PUSCH signal carrying the measurements collected (e.g., event-based reports) collide with a signal, the UE can take various actions as described above.

In some embodiments, a gNB configures the event(s) based on which UE (e.g., which specific UEs) can report the L3 results. In some examples the events are default events and are not specific to a particular UE.) If multiple events are configured, the UE can report the multiple events that are detected. A gNB can configure a UE to determine an event based on a single beam (e.g., single TCI state) or a set of beams (e.g., set of TCI states.) If the gNB configures a set of beams, the measured results can be based on a minimum, maximum, or average results from the set of beams.

Figure 5:
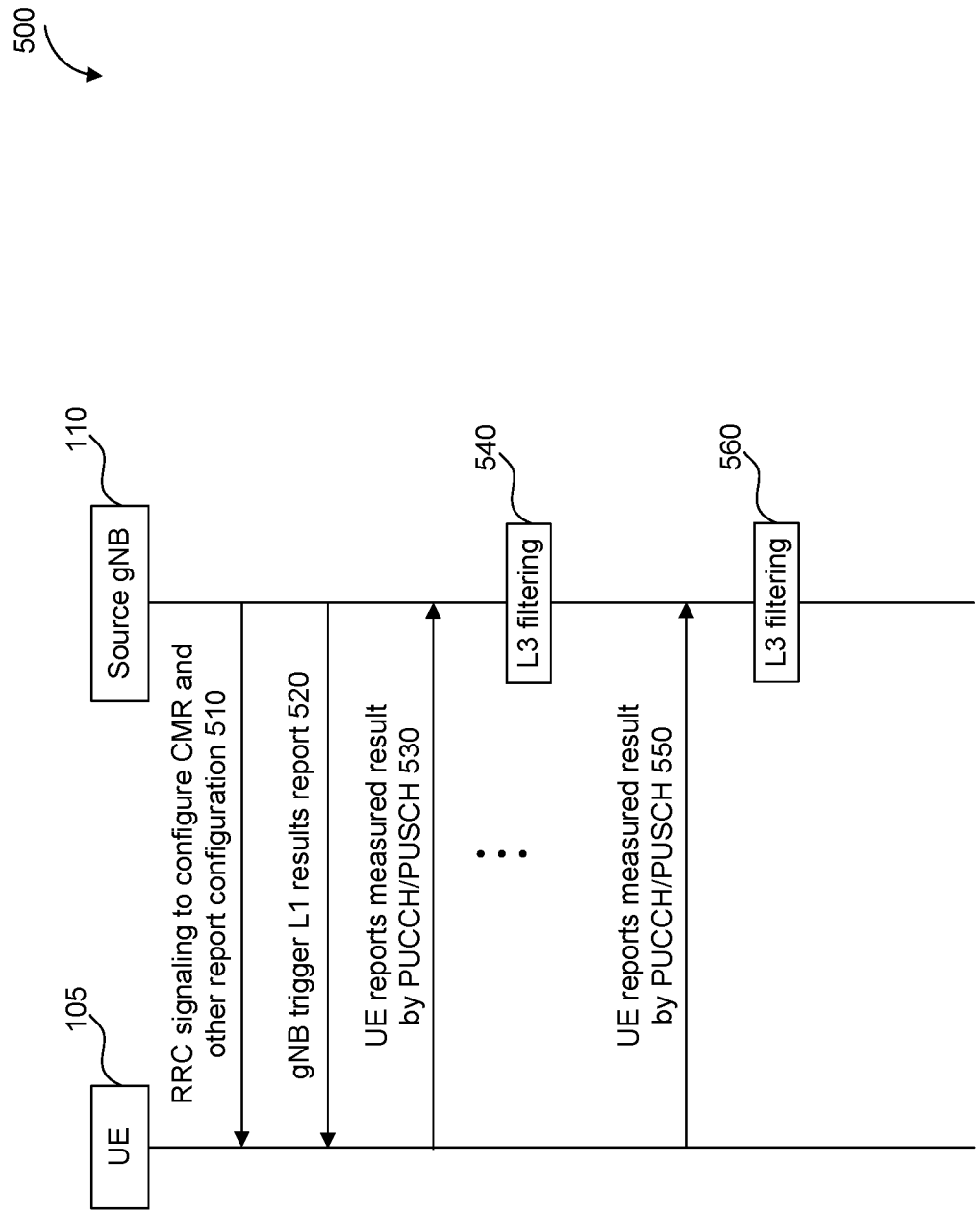
FIG. 5 illustrates a gNB triggering and receiving a layer 1 (L1) results report, then performing L3 filtering, according to some embodiments of the disclosure.

FIG. 5 illustrates an example 500 of a gNB triggering and receiving a L1 results report, then performing L3 filtering, according to some embodiments of the disclosure. The gNB uses the filtered data to make handover decisions. As a convenience and not a limitation, example 500, may be described with elements of FIGS. 1-3, 4A, and/or 4B. Example 500 is described first from Source gNB 110's point of view followed by UE 105's point of view.

Example 500 from Source gNB 110's Point of View:

At 510, Source gNB 110 transmits RRC signaling to configure CMR and other report configurations. The RRC signaling can include configuration report request 300 (e.g., a reportConfig) of FIG. 3, for low layer inter-cell mobility management. The configuration can request L1 measurements in a report, including but not limited to: L1-RSRP, a L1-RSRQ, or a L1-SINR. The report can be configured to be periodic, semi-persistent, or aperiodic, and the report can be configured to be transmitted to Source gNB 110 by an Uplink Control Information (UCI) signal.

At 520, source gNB 110 transmits a signal that triggers UE 105 to respond with a L1 results report based on the report configurations arranged at 510 (e.g., configuration report request 300.) For example, the report can be triggered by an RRC signal, a MAC CE, or a DCI signal.

At 530, Source gNB 110 receives the L1 results report via UCI signaling at L1 (e.g., via a PUCCH signal or a PUSCH signal.) The L1 results report can include for example, measurements of TCI states from neighboring cells collected by UE 105 based on configuration report request 300 and other configurations at 405. Source gNB 110 also receives an indication of whether the L1 results report is received from a same TCI state as a previous L1 results report (not shown). For example, if the L1 results report is received from the same TCI state (e.g., same beam) as the previous L1 results report, then Source gNB 110 can consider the L1 results report as a continuation of the previous L1 results report. If, however, Source gNB 110 also receives an indication that the L1 results report is received from a different TCI state (e.g., different beam) than the previous L1 results report, then Source gNB 110 does not process the L1 results report as a continuation of the previous L1 results report received.

At 540, Source gNB 110 performs L3 filtering on the one or more L1 results reports received at 530.

550 is similar to 530 and 560 is similar to 540. 550 and 560 illustrate that the reporting and filtering continues over time.

Figure 6:
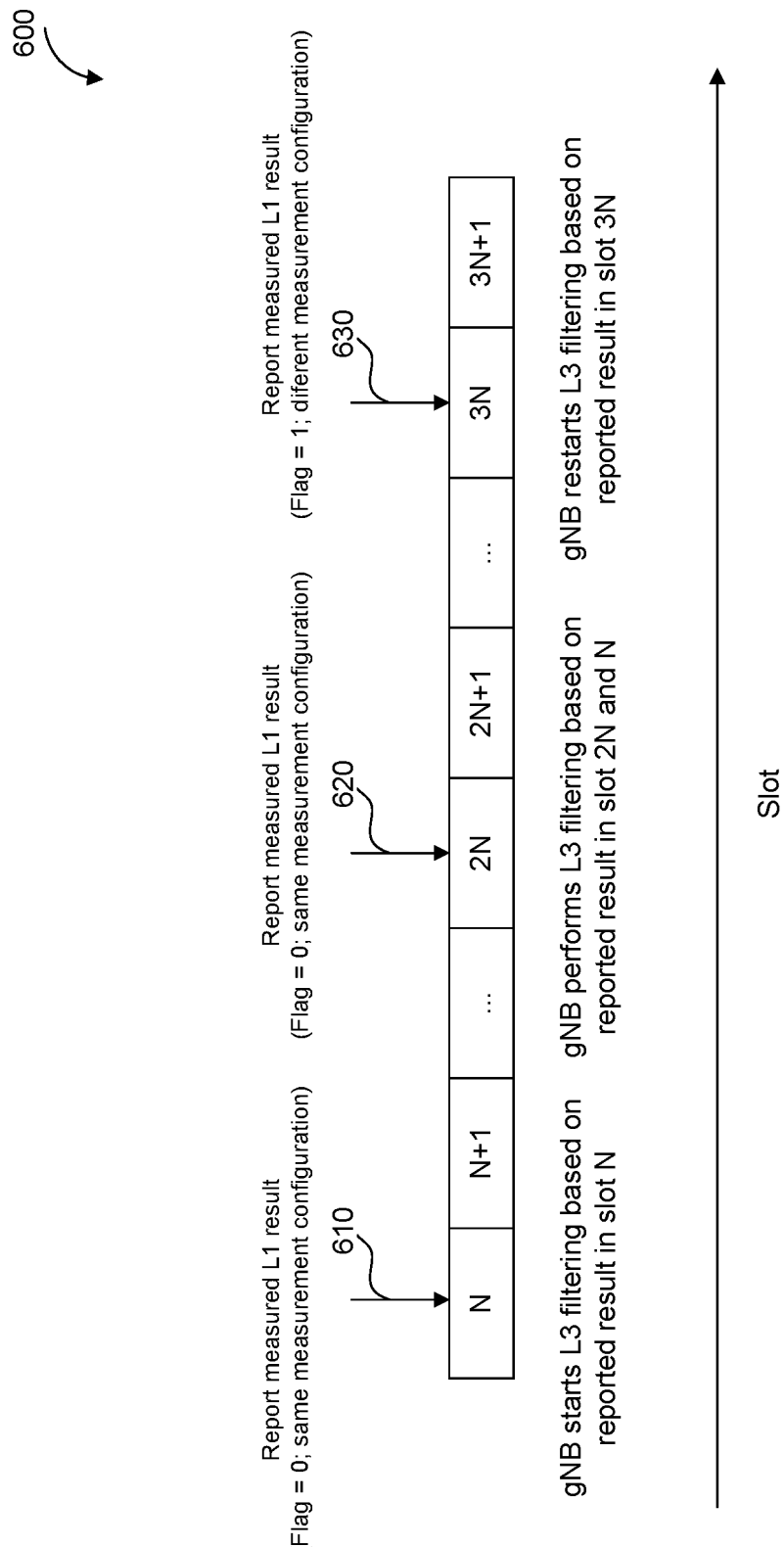
FIG. 6 illustrates L3 filtering of L1 results reports, according to some embodiments of the disclosure.

FIG. 6 illustrates an example 600 of L3 filtering of L1 results reports, according to some embodiments of the disclosure. As a convenience and not a limitation, example 600, may be described with elements of FIGS. 1-3, 4A, 4B, and/or 500. For a TCI state, a UE can apply different Rx beams (e.g., downlink reception beams) to different SSB/CSI-RS instances. A TCI state can indicate that a UE can use the same downlink reception beam (e.g., Rx beam) to receive signal A and B, where signal A is the source reference signal (RS) configured in a TCI state and signal B is the target channel to which the TCI state is applied. Accordingly, the UE can transmit an indication (e.g., a flag) with each L1 results report to inform a gNB whether a L1 results report is received from a same downlink reception beam and the L3 filtering should continue, or whether the L1 results report is from a different downlink reception beam and thus, L3 filtering should begin anew.

At 610, Source gNB 110 receives at slot N, a first L1 results report and an indication (e.g., Flag=0) that the L1 results report is from a same measurement configuration (e.g., a same downlink reception beam.) But since this is the first L1 results report, there is not a previous L1 results report. Accordingly, Source gNB 110 begins L3 filtering based on the L1 results report received in slot N.

At 620, Source gNB 110 receives at slot 2N, a second L1 results report and an indication (e.g., Flag=0) that the second L1 results report is from the same measurement configuration (e.g., the same downlink reception beam) as the previous results report (e.g., the first L1 results report.) Accordingly, Source gNB 110 interprets the second L1 results report as a continuation of the first L1 results report and continues to perform L3 filtering based on the second L1 results report received in slot 2N.

At 630, Source gNB 110 receives at slot 3N, a third L1 results report and an indication (e.g., Flag=1) that the third L1 results report is from a different measurement configuration (e.g., a different downlink reception beam) than the previous L1 results report (e.g., the second L1 results report). Accordingly, Source gNB 110 interprets the third L1 results report as a new L1 signal and restarts L3 filtering based on the third L1 results report received in slot 3N.

Figure 7:
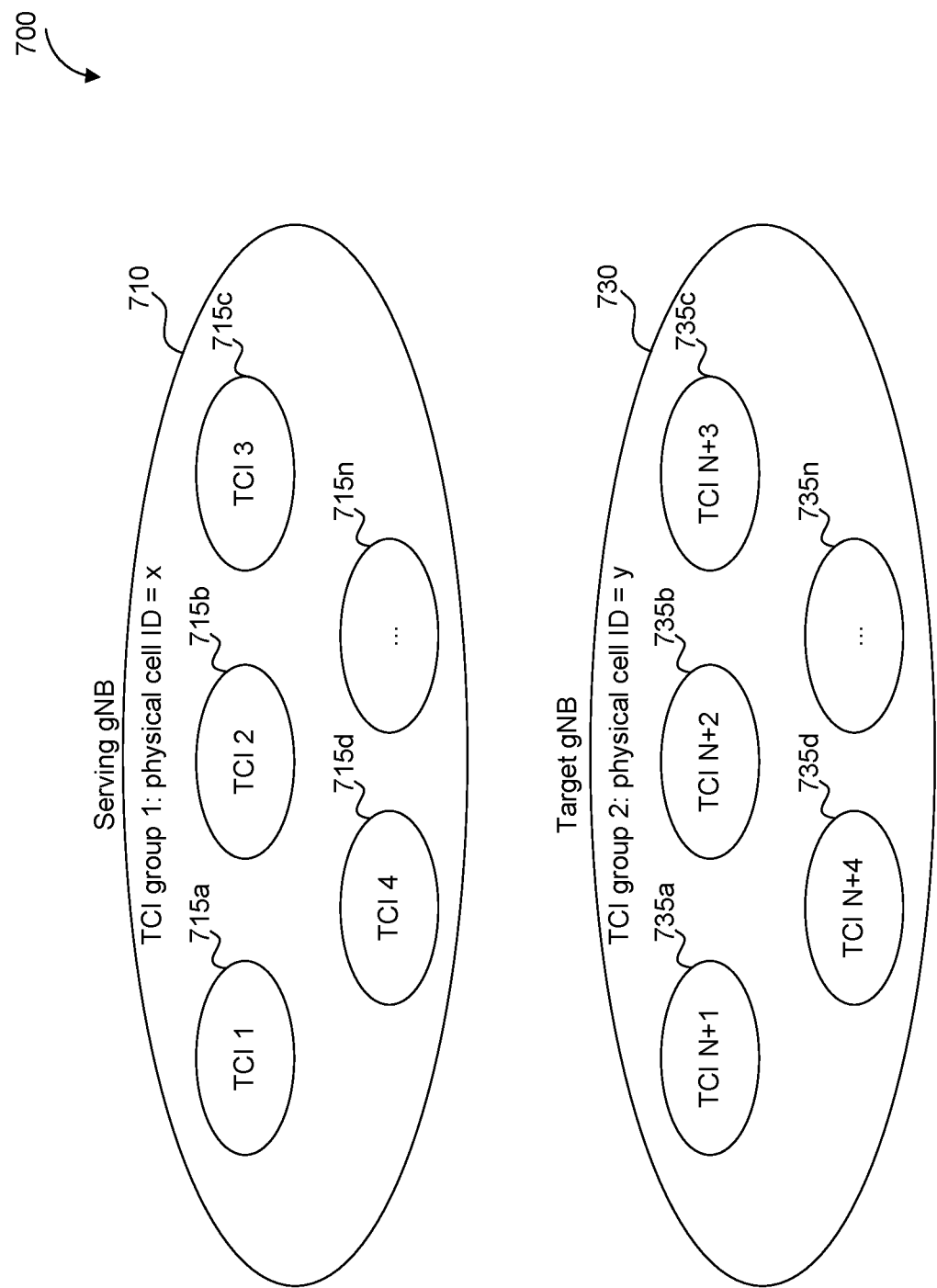
FIG. 7 illustrates grouping Transmission Configuration Indication (TCI) states into groups per cell, according to some embodiments of the disclosure.

FIG. 7 illustrates an example 700 of grouping Transmission Configuration Indication (TCI) states into groups per cell, according to some embodiments of the disclosure. As a convenience and not a limitation, example 700, may be described with elements of FIGS. 1-3, 4A, 4B, 5, and/or 6. In some embodiments a gNB such as a Serving gNB (e.g., Source gNB 110) can configure N groups of TCI states for a UE (e.g., UE 105) by RRC signaling (e.g., see FIG. 3). The TCI states within a group can be used for one cell. In some embodiments TCI state groups can be configured explicitly as shown in Serving gNB cell 710. The TCI group 1 corresponds to the physical cell ID=x. Each of the TCI states (e.g., each beam) can be configured explicitly such as "TCI 1" at 715a, "TCI 2" at 715b, and so on. The TCI group 2 corresponds to the physical cell ID=y. The TCI group 2 can be configured implicitly. TCI states in group 1 and 2 could refer to different RRC parameters and configurations, since they belong to different cells. The configuration for cell 1 and 2 could be quite different. In particular, group 1 could refer to different RRC Reconfiguration parameters than the RRC Reconfiguration parameters of group 2.

Figure 8:
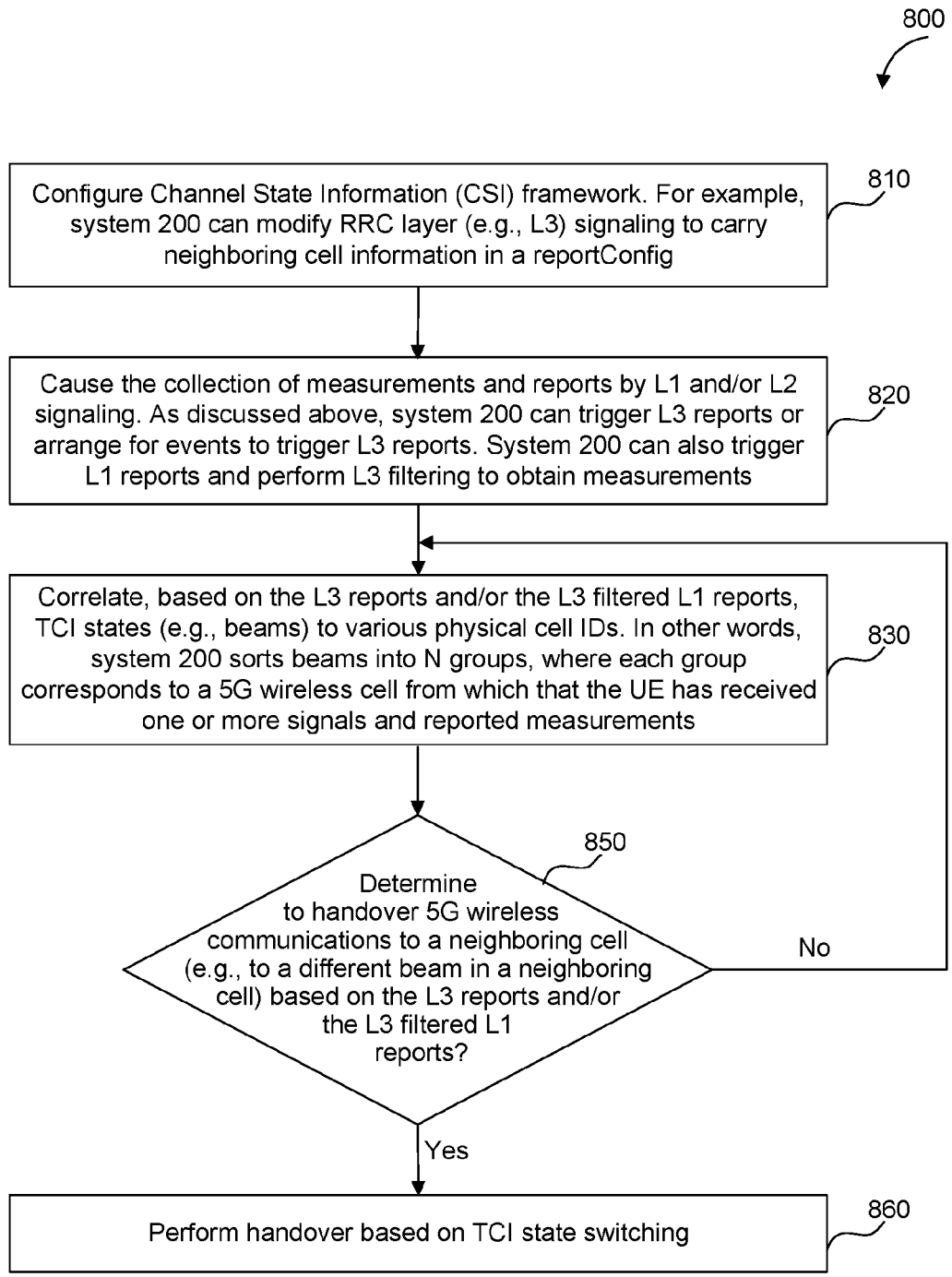
FIG. 8 illustrates a method for an example gNB for low layer inter-cell mobility management, according to some embodiments of the disclosure.

FIG. 8 illustrates a method 800 for an example gNB for low layer inter-cell mobility management, according to some embodiments of the disclosure. As a convenience and not a limitation, method 800, may be described with elements of FIGS. 1-3, 4A, 4B, 5, 6, and/or 7. For example, method 800 may be performed by a gNB such as Source gNB 110 of FIG. 1 or system 200 of FIG. 2.

At 810, system 200 configures Channel State Information (CSI) framework. For example, system 200 can modify RRC layer (e.g., L3) signaling to carry neighboring cell information in a reportConfig. In some examples, system 200 can configure SSB/PBCH and/or CSI-RS from a neighboring cell as a CMR that enables a source gNB (e.g., Source gNB 110) to configure N groups of beams (e.g., TCI states) for a UE, where each group of beams is associated with a different physical cell.

At 820, system 200 causes the collection of measurements defined in the CSI framework and cause measurement reports by L1 and/or L2 signaling. As discussed above, system 200 can trigger L3 reports or arrange for events to trigger L3 reports that are then transmitted by L1 and/or L2 signaling. System 200 can also trigger L1 reports and perform L3 filtering to obtain measurements.

At 830, system 200 correlates, based on the L3 reports and/or the L3 filtered L1 reports, TCI states (e.g., beams) to various physical cell IDs. In other words, system 200 sorts beams into N groups, where each group corresponds to a 5G wireless cell from which that the UE has received one or more signals and reported measurements. For example, system 200 uses RRC signaling to configure X TCI states, which can belong to N groups that can include a first TCI state group that corresponds to a serving gNB cell (e.g., Source gNB 110 cell) and a second TCI state group that corresponds to a neighboring cell (e.g., Target gNB 115 cell). Subsequently, system 200 uses MAC CE signaling to select a TCI state from the X TCI states. In this example, system 200 can use MAC CE signaling to select a TCI state from the second TCI state group corresponding to Target gNB 115 cell.

At 850, system 200 determines whether to handover 5G wireless communications to a neighboring cell (e.g., to a different beam in a neighboring cell) based on the L3 reports and/or the L3 filtered L1 reports. When a handover is determined, method 800 proceeds to 860. Otherwise, method 800 returns to 830 to continue collecting and assessing measurements.

At 860, system 200 performs handover based on TCI state switching. A TCI state group can be associated with a set of RRC parameters configured in RRC reconfiguration. A gNB can reconfigure these RRC parameters for each TCI state group via RRC signaling or via MAC CE. Given that MAC CE occurs at L2 and requires less overhead, using MAC CE to reconfigure the RRC parameters for each TCI state group would experience less delay than using RRC signaling at L3.

System 200 can perform TCI state switching via MAC CE or by DCI signaling. In some embodiments, system 200 can transmit a new TCI state from a different group (e.g., a different 5G wireless cell such as a neighboring cell) to a UE via MAC CE (e.g., L2 signaling.) After receiving the new TCI state via MAC CE, the UE sends the ACK for the MAC CE and waits for a given number of slots (or milliseconds), before the UE can start communicating with the new cell that corresponds to the physical cell ID associated with the new TCI state.

In some embodiments, system 200 can transmit a new TCI state from a different group (e.g., a different 5G wireless cell such as a neighboring cell) to a UE via DCI signaling (e.g., L1 signaling.) The DCI signaling can be: i) a downlink assignment, ii) an uplink grant, or iii) a dedicated DCI format. If a DCI downlink assignment is used the format can be as follows: DCI format 1_0 or DCI format 1_1. After receiving the new TCI state via DCI downlink assignment, the UE sends the ACK for the DCI downlink assignment, and waits for a given number of slots (or milliseconds) pass, before the UE begins communicating with the new cell that corresponds to the physical cell ID associated with the new TCI state. If a DCI uplink grant is used the format can be as follows: DCI format 0_0 or DCI format 0_1. After receiving the new TCI state via DCI uplink grant, the UE waits for a given number of slots (or milliseconds) after the UE sent the PUSCH signal, and then the UE can start communicating with the new cell that corresponds to the physical cell ID associated with the new TCI state. Finally, if a dedicated DCI format is used the format can be as follows: DCI format 0_0 or DCI format 0_1. After receiving the new TCI state via a dedicated DCI format, the UE waits for a given number of slots (or milliseconds) after the slot carrying the dedicated DCI format to pass, and then the UE can start communicating with the new cell that corresponds to the physical cell ID associated with the new TCI state.

Figure 9:
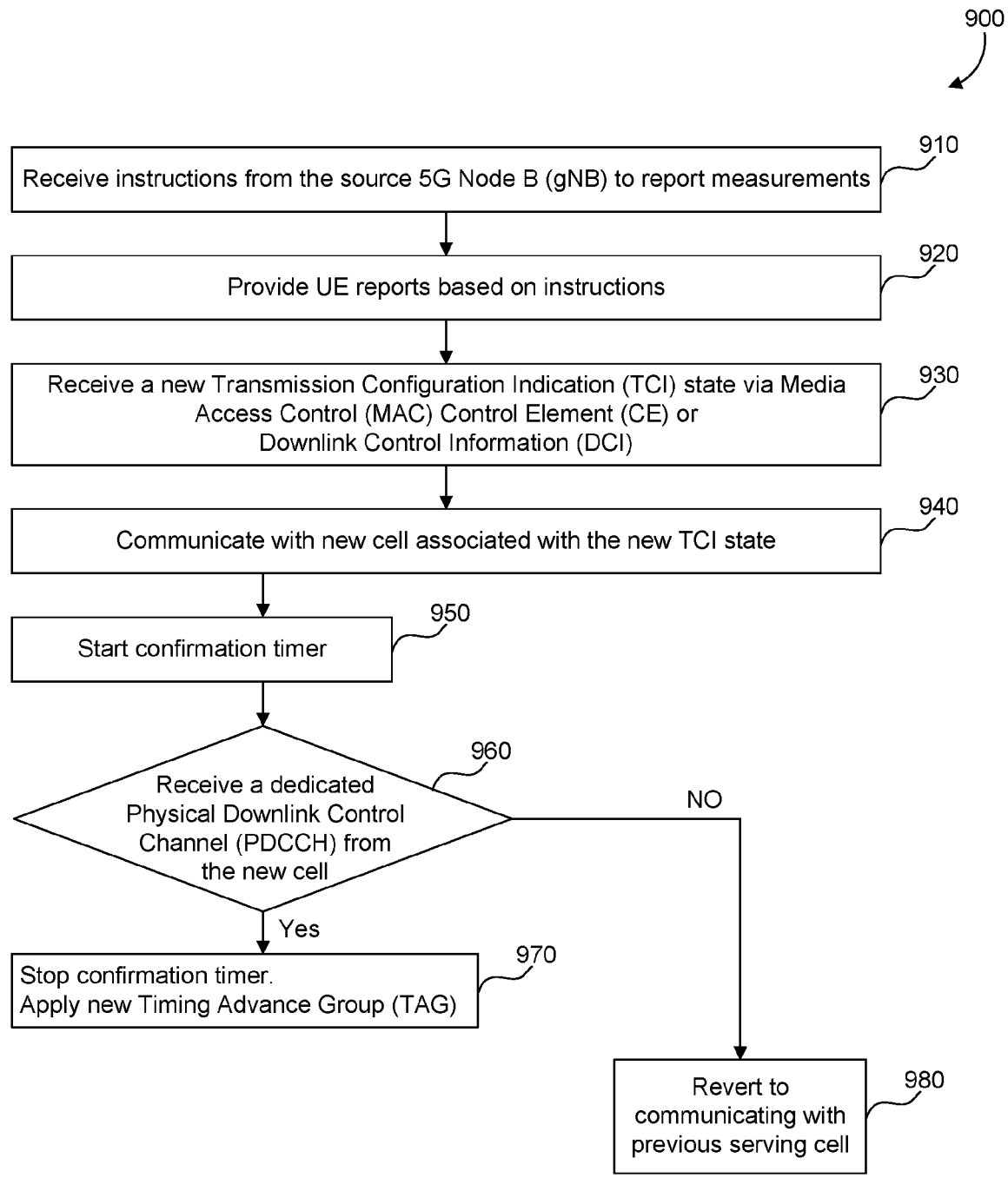
FIG. 9 illustrates a method for an example user equipment (UE) for low layer inter-cell mobility management, according to some embodiments of the disclosure.

FIG. 9 illustrates a method 900 for an example user equipment (UE) for low layer inter-cell mobility management, according to some embodiments of the disclosure. As a convenience and not a limitation, method 900, may be described with elements of one or more earlier figures. For example, method 800 may be performed by UE 105 of FIG. 1 or system 200 of FIG. 2.

At 910, system 200 receives instructions from a source gNB to report measurements.

At 920, system 200 transmits reports based on the instructions. For example, system 200 may transmit reports based on triggered signals from a source gNB or system 200 may transmit reports based on events that trigger reports. The reports include measurements of various TCI states (e.g., beams) corresponding to 5G wireless cells.

At 930, system 200 receives a new TCI state via MAC CE or DCI signaling.

At 940, system 200 acknowledges receipt of the MAC CE or DCI signaling and waits for the appropriate amount of slots or time to pass before communicating with the new cell that corresponds to the physical cell ID associated with the new TCI state.

At 950, system 200 starts a confirmation timer. The confirmation timer is a mechanism by which system 200 can revert to communicating with the previous serving cell when the handover to the new cell fails.

At 960, system 200 determines whether a dedicated PDCCH signal from the new cell is received. When a dedicated PDCCH signal from the new cell is received the handover is successful and, method 900 proceeds to 970. Otherwise, the handover fails and method 900 proceeds to 980.

At 970, the handover is successful. System 200 stops the confirmation timer and applies a new Timing Advance Group (TAG) associated with the new cell.

At 980, the handover has failed and system 200 reverts to communicating with the previous serving cell.

Figure 10:
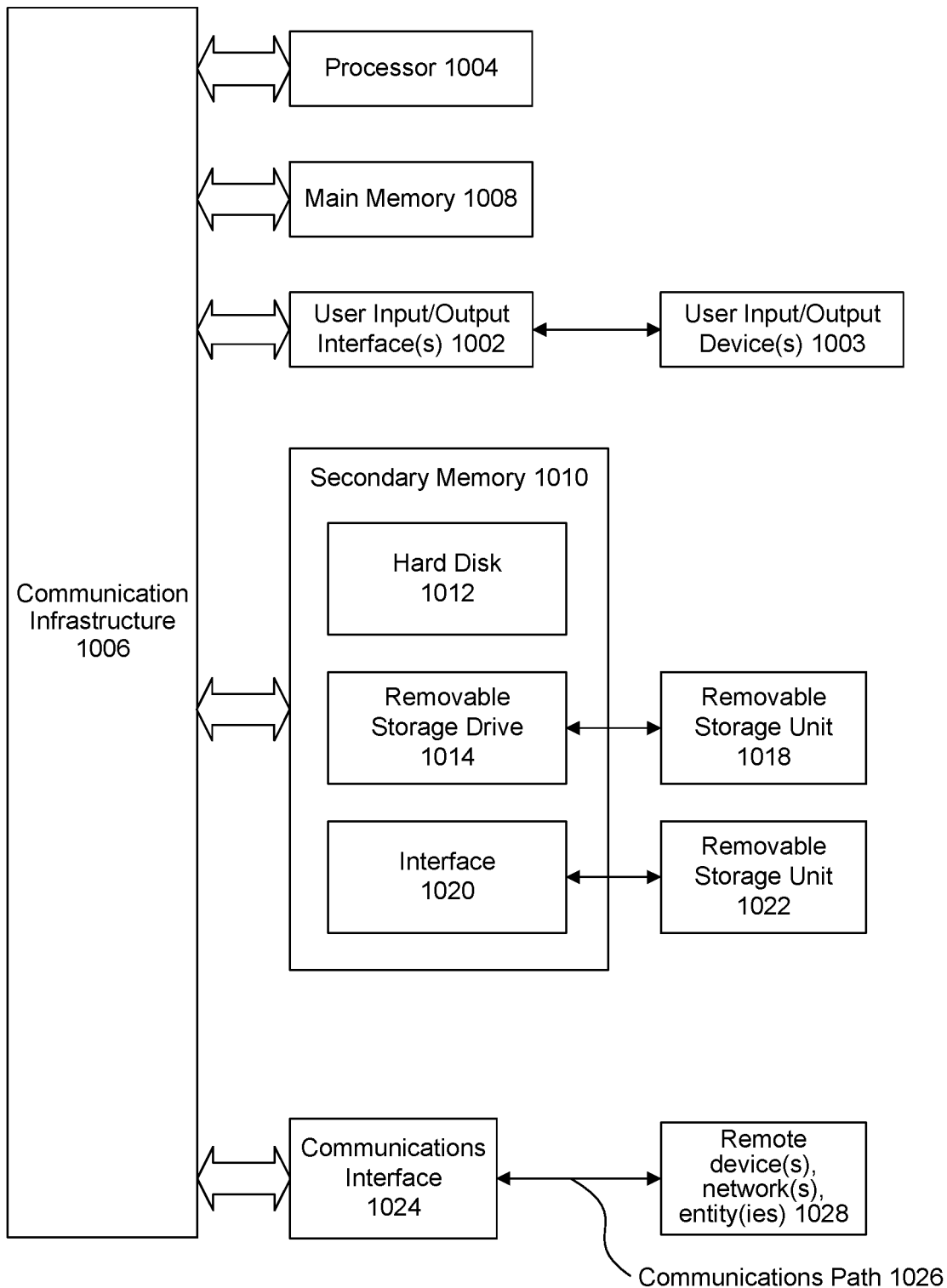
FIG. 10 is an example computer system for implementing some embodiments or portion(s) thereof.

Various embodiments can be implemented, for example, using one or more well-known computer systems, such as computer system 1000 shown in FIG. 10. Computer system 1000 can be any well-known computer capable of performing the functions described herein. For example, and without limitation, system 200 of FIG. 2, method 800 of FIG. 8, and method 900 of FIG. 9 (and/or other apparatuses and/or components shown in the figures) may be implemented using computer system 1000, or portions thereof.

Computer system 1000 includes one or more processors (also called central processing units, or CPUs), such as a processor 1004. Processor 1004 is connected to a communication infrastructure or bus 1006. One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A serving base station (BS), comprising:
a transceiver configured to transmit and receive wireless communications; and
a processor, coupled to the transceiver, configured to:
determine Synchronization Signal Block (SSB) or Channel-State Information-Reference Signal (CSI-RS) measurements to be performed on a neighboring cell as a Channel Measurement Resource (CMR) in a reportConfig;
transmit, using the transceiver, the reportConfig to a user equipment (UE);
collect data comprising a physical cell ID of the neighboring cell based at least on the reportConfig;
configure N groups of Transmission Configuration Indication (TCI) states for the UE, wherein a first group of the N groups corresponds to a serving BS cell and a second group of the N groups corresponds to the physical cell ID of the neighboring cell;
decide to perform a handover based at least on the data; and
perform the handover from a first TCI state of the first group to a second TCI state of the second group.

2. The serving BS of claim 1, wherein to collect the data, the processor is further configured to:
trigger a layer 3 (L3) results report; and
receive the L3 results report from the UE via an Uplink Control Information (UCI) signal, wherein the L3 results report comprises: a L3-Reference Signal Received Power (RSRP), a L3-Reference Signal Received Quality (RSRQ), or a L3-Signal to Noise & Interference Ratio (SINR).

3. The serving BS of claim 2, wherein to trigger the L3 results report, the processor is configured to:
use Radio Resource Control (RRC) signaling, Media Access Control (MAC) Control Element (CE) signaling, or Downlink Control Information (DCI) signaling.

4. The serving BS of claim 2, wherein the UCI signal comprises a Physical Uplink Control Channel (PUCCH) signal or a Physical Uplink Shared Channel (PUSCH) signal.

5. The serving BS of claim 1, wherein the processor is further configured to:
determine an event that triggers an event-based report;
reserve a resource in a Physical Uplink Control Channel (PUCCH) signal or a Physical Uplink Shared Channel (PUSCH) signal that enables the UE to provide the event-based report; and
transmit, using the transceiver, the event that triggers the event-based report and the reserved resource to the UE.

6. The serving BS of claim 5, wherein the processor is further configured to:
receive the event-based report from the UE via an Uplink Control Information (UCI) signal, wherein the event-based report comprises: a layer 3 (L3)-Reference Signal Received Power (RSRP), a L3-Reference Signal Received Quality (RSRQ), or a L3-Signal to Noise & Interference Ratio (SINR).

7. The serving BS of claim 1, wherein the processor is further configured to:
trigger a layer 1 (L1) results report; and
receive the L1 results report from the UE via an Uplink Control Information (UCI) signal, wherein the L1 results report comprises: a L1-Reference Signal Received Power (RSRP), a L1-Reference Signal Received Quality (RSRQ), or a L1 Signal to Noise & Interference Ratio (SINR).

8. The serving BS of claim 7, wherein the processor is further configured to:
receive an indication of whether the L1 results report is received from a same downlink reception beam as a previous L1 results report;
determine based on the indication that the L1 results report is from the same downlink reception beam as the previous L1 results report;
perform layer 3 (L3) filtering based on the previous L1 results report and the L1 results report; and
configure the N groups of TCI states based at least on a result of the L3 filtering, and wherein the decision to perform the handover is based at least on the result of the L3 filtering.

9. The serving BS of claim 7, wherein the processor is further configured to:
receive an indication of whether the L1 results report is received from a same downlink reception beam as a previous L1 results report;
determine based on the indication that the L1 results report is from a different downlink reception beam than the previous L1 results report;
perform layer 3 (L3) filtering on the L1 results report; and
configure the N groups of TCI states based at least on a result of the L3 filtering, and wherein the decision to perform the handover is based at least on the result of the L3 filtering.

10. The serving BS of claim 1, wherein to perform the handover, the processor is configured to:
use a Media Access Control (MAC) Control Element (CE) to switch from the first TCI state to the second TCI state.

11. The serving BS of claim 1, wherein to perform the handover, the processor is configured to:
use a Downlink Control Information (DCI) signal to switch from the first TCI state to the second TCI state, wherein the DCI signal comprises a downlink assignment, an uplink grant, or a dedicated DCI format.

12. A user equipment (UE), comprising:
a transceiver configured to transmit and receive wireless communications; and
a processor, coupled to the transceiver, configured to:
receive instructions from a serving base station (BS) to report measurements;
transmit, using the transceiver, a report based on the instructions to the serving BS;
subsequent to transmitting the report, receive from the serving BS via a Media Access Control (MAC) Control Element (CE) or a Downlink Control Information (DCI) signal, a new Transmission Configuration Indication (TCI) state of a neighboring cell; and
switch from a TCI state of a serving BS cell to the new TCI state; and
communicate, using the transceiver, with the neighboring cell via the new TCI state.

13. The UE of claim 12, wherein the instructions comprise a request for a layer 3 (L3) results report, the processor is configured to:
transmit, using the transceiver, the L3 results report via a Physical Uplink Control Channel (PUCCH) signal or a Physical Uplink Shared Channel (PUSCH) signal.

14. The UE of claim 12, wherein the instructions comprise an event that triggers an event-based report and a reserved resource, the processor is configured to:
determine that the event is triggered; and
transmit, using the transceiver, the event-based report according to the reserved resource via a Physical Uplink Control Channel (PUCCH) signal or a Physical Uplink Shared Channel (PUSCH) signal.

15. The UE of claim 14, wherein the processor is further configured to:
determine that the PUCCH signal or the PUSCH signal collides with a second signal;
drop the PUCCH signal or the PUSCH signal; and
subsequently resend the PUCCH signal or the PUSCH signal.

16. The UE of claim 15, wherein the second signal is: a Physical Random Access Channel (PRACH) signal, a Scheduling Request (SR) signal, or a Hybrid Automatic Repeat Request (HARQ)-ACK signal.

17. The UE of claim 12, wherein the instructions comprise an event that triggers an event-based report, the processor is configured to:
determine that the event is triggered; and
request a resource by dedicated or normal scheduled request (SR) to transmit the event-based report.

18. The UE of claim 12, wherein to communicate with the neighboring cell via the new TCI state, the processor is configured to:
start a confirmation timer;
receive a dedicated Physical Downlink Control Channel (PDCCH) from the neighboring cell via the new TCI state;
in response to the PDCCH, stop the confirmation timer; and
apply a new Timing Advance Group (TAG) corresponding to the neighboring cell before transmitting an uplink signal.

19. A method, comprising:
defining, by a serving base station (BS), a reportConfig comprising a physical cell ID of a neighboring cell;
transmitting, by the serving BS, the reportConfig to a user equipment (UE);
receiving, by the serving BS, a results report based on the reportConfig;
grouping, by the serving BS, a first group of Transmission Configuration Indication (TCI) states corresponding to a serving BS cell, and a second group of TCI states corresponding to a neighboring cell, for the UE;
deciding, by the serving BS, to perform a handover based at least on the results report; and
performing, by the serving BS, the handover from a first TCI state of the first group to a second TCI state of the second group.

20. The method of claim 19, wherein the performing the handover comprises:
using a Media Access Control (MAC) Control Element (CE) or a Downlink Control Information (DCI) signal, to switch from the first TCI state to the second TCI state.

* * * * *